United States Patent

[11] 3,563,142

| [72] | Inventor | Donald M. Harvey |
| | | Webster, N.Y. |
| [21] | Appl. No. | 755,869 |
| [22] | Filed | Aug. 28, 1968 |
| [45] | Patented | Feb. 16, 1971 |
| [73] | Assignee | Eastman Kodak Company |
| | | Rochester, N.Y. |
| | | a corporation of New Jersey |

[54] PROGRAMMED SHUTTER
8 Claims, 10 Drawing Figs.
[52] U.S. Cl. ............................................. 95/10, 95/64
[51] Int. Cl. ........................................ G03b 9/06, G03b 7/00
[50] Field of Search ........................................ 95/10C, 64, 64C, 59, 60, 61

[56] References Cited
UNITED STATES PATENTS

| 2,917,982 | 12/1959 | Martin................. | 95/60X |
| 3,045,569 | 7/1962 | Booth et al. ........... | 95/10(C) |
| 3,071,055 | 1/1963 | Stimson et al. ......... | 95/10(C) |
| 3,233,531 | 2/1966 | Fairbank................ | 95/63X |
| 3,385,187 | 5/1968 | Bestenreiner........... | 95/10(C) |
| 3,456,570 | 7/1969 | Heinzmann.............. | 95/64(D) |

*Primary Examiner*—John M. Horan
*Assistant Examiner*—Joseph F. Peters, Jr.
*Attorneys*—Robert W. Hampton and G. Herman Childress ABSTRACT: A photographic exposure control system utilizing a simple three-member programmed shutter and a needle trap meter movement. The indicating needle of conventional exposure meter is used to control the relative positions of the shutter members and thereby control the exposure aperture and exposure time provided by the programmed shutter in accordance with the level of field brightness of the subject to be photographed.

PATENTED FEB 16 1971　　3,563,142

INVENTOR
DONALD M. HARVEY

BY D. Herman Childress
Robert W. Hampton
ATTORNEY

INVENTOR
DONALD M. HARVEY

BY G. Herman Childress
Robert W. Hampton
ATTORNEY

PROGRAMMED SHUTTER

BACKGROUND OF THE INVENTION

1. Field of the Invention

This invention relates to photographic cameras and in particular to programmed shutters for use in such cameras. More particularly, this invention relates to a simple three-member programmed shutter arrangement which preferably operates in combination with a conventional photoelectric scene luminance sensing device to control the exposure at the film plane of a camera.

2. Description of the Prior Art

Shutters which simultaneously control both exposure time and the effective f/number (i.e., the exposure aperture) of the taking lens so as to produce a unique combination of both for a given scene luminance are generally known in the art as "programmed shutters." Inherently characteristic of such shutters is the fact that the duration of the exposure time provided thereby is directly proportional to the size of the exposure aperture provided thereby. In other words, as the exposure aperture gradually becomes larger, the exposure time gradually becomes longer, and vice versa. Since both exposure time and aperture size are variable, the programmed shutter is capable of accommodating a wider range of scene luminance than conventional exposure systems of the type having one of the exposure parameters, exposure time or aperture size, fixed at a constant value.

The inherent advantage of wide dynamic range makes the programmed shutter a desirable substitute, in some instances, for the above-mentioned conventional exposure systems. But, programmed shutters have not enjoyed widespread use in the photographic industry due to their relatively complex construction. Generally, such shutters have been comprised of a multitude of precision-made moving parts which must be meticulously assembled by skilled technicians in order to function properly. Obviously such construction not only adds considerably to the cost, but also increases the likelihood of malfunction.

SUMMARY OF THE INVENTION

In accordance with the present invention a simple three-member programmed shutter is provided which, because of its simplicity, is suitable for use in comparatively inexpensive photographic cameras. Basically the programmed shutter comprises (a) two movable vanes having apertures therein which cooperatively function as a shutter and exposure aperture, and (b) a linking member which interconnects and establishes the relative positions of the two apertured vanes. Preferably the relative positions of the two apertured members are controlled by the level of scene luminance of the object of photographic interest and a "needle trap meter movement" is used in a conventional manner (e.g., as shown in U.S. Pat. No. 3,045,569, issued July 24, 1962 to J. H. Booth et al.) for this purpose.

It is a primary object of this invention to provide an improved programmed shutter.

Another object of this invention is to provide a programmed shutter which is both simple and inexpensive to manufacture.

A further object of this invention is to provide an automatic photoelectric exposure control system which incorporates an extremely simple, rugged and inexpensive programmed shutter arrangement.

Still another object of this invention is to provide a unique wide range automatic exposure control system which incorporates a programmed shutter and a needle trap meter movement.

These and other objects of the present invention will become immediately apparent to those skilled in the art from the ensuing description, reference being made to the accompanying drawings.

DETAILED DESCRIPTION OF PREFERRED EMBODIMENTS

Figure 1:
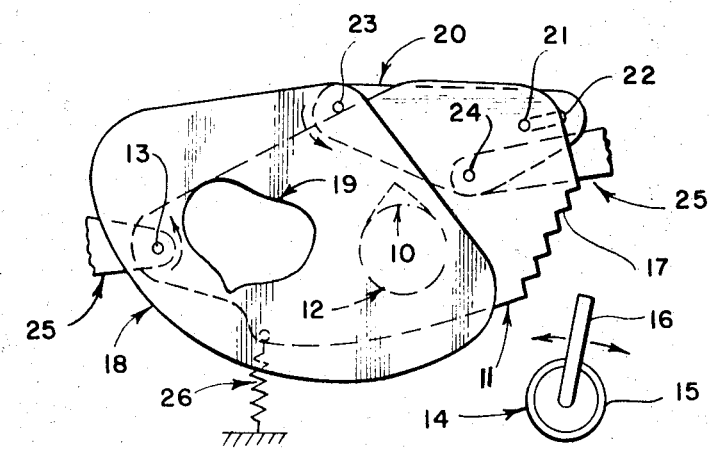
FIGS. 1—4 show the relative positions of the three basic elements of the programmed shutter during various stages of shutter operation.

Referring now to the drawings, wherein like reference numerals designate like parts, an automatic exposure control system of the type embodied by the present invention is shown in combination with a camera taking lens 10. As shown in FIG. 1, the system is basically comprised of two apertured vanes 11 and 18 which cooperatively function as a shutter and exposure aperture, a triangularly shaped linking member 20 which establishes the relative positions of the two apertured vanes, and a photoelectric scene luminance level detecting device 14 having a movable indicating needle 16 which acts on the apertured vanes so as to vary the exposure produced thereby in accordance with the level of scene luminance.

Vane 11, hereinafter occasionally referred to as the "aperture vane," has a fixed aperture 12 formed therein and has a graduated series of teeth 17 formed in a portion of its periphery. This vane is pivotally mounted by pin 13 to the camera housing 25 (shown schematically) and is biased by a spring 26 to rotate about pin 13 in a clockwise direction, as viewed in all drawings. Furthermore, aperture vane 11 is so arranged within the camera housing that aperture 12 may be moved into varying degrees of coincidence with taking lens 10 during the pivotal movement of aperture vane 11 and thereby partially establish an exposure aperture. In a manner hereinafter explained, the degree of coincidence between taking lens 10 and aperture 12 is determined by the level of scene luminance of the subject matter to be photographed.

Figure 2:
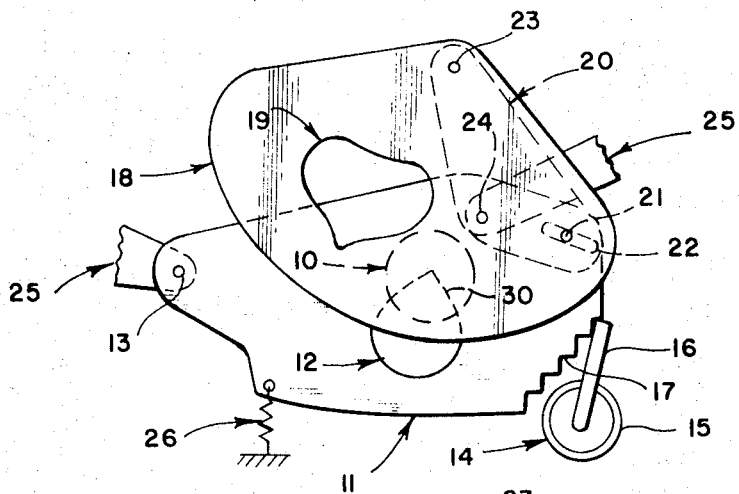
Figure 5:
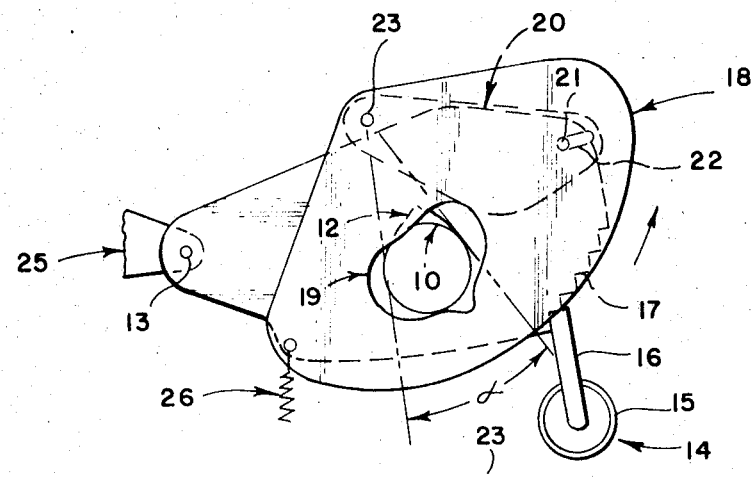
FIG. 5 shows the relative positions of the basic programmed shutter elements when the light meter senses a low scene luminance.

The photoelectric scene luminance level detecting device 14 is mounted within the camera housing in such a manner as to act on aperture vane 11 and thereby control its position. This device comprises, in part, a conventional galvanometer 15, operably controlled, in a well-known manner, by a photosensitive element (not shown) arranged in an electric circuit with a source of electric current, and a scene luminance level indicating needle 16, the latter being positionable by the galvanometer in accordance with the quantity of light striking the photosensitive element. As arranged in the camera housing, the tip of needle 16 may interact with the graduated series of teeth 17, formed in the periphery of vane 11, when said vane is permitted to rotate sufficiently in a clockwise direction about pin 13. As viewed in all drawings, the tip of needle 16 is arranged so as to move to the right, or toward the upper most tooth of the series of teeth 17, in response to a high scene luminance. Thus, as can be seen in FIG. 2, vane 11 is permitted to pivot a considerable distance in a clockwise direction when needle 16 is in a position indicative of a high scene luminance and, as a result, the partially established exposure aperture 30 which is created by the overlap between lens 10 and aperture 12 is relatively small in comparison with the effective diameter of the taking lens 10. Conversely, as shown in FIG. 5, when needle 16 is in a position indicative of low scene luminance (i.e., far to the left), vane 11 is stopped much sooner during the clockwise pivotal movement thereof and thereby creates an overlap between taking lens 10 and aperture 12 which approximates the effective diameter of the taking lens 10.

Vane 18, hereinafter occasionally referred to as the "shutter vane," has a fixed aperture 19 formed therein which may be caused to sweep across the partially established exposure aperture 30, in varying degrees of optical alignment, and thereby simultaneously complete the establishment of an exposure aperture and effect an exposure at the film plane. Aperture 19 is preferably elongated from left to right (as viewed in the drawings) to achieve high efficiency at low shutter speeds. Shutter vane 18 is pivotally mounted, by means of pin 23 on linking member 20, which, in turn, is pivotally mounted, by means of pin 24, to the camera housing 25. Linking member 20 is also connected to aperture vane 11 by means of an engagement between pin 21 (carried by member 11) and slot 22 formed in said linking member. Thus, since the pivot pin 24 is firmly attached to the camera housing, pin 23 represents a movable pivot point for shutter vane 18, the position of which may be varied as linking member 20 pivots about pin 24. Since linking member 20 interconnects aperture vane 11 with shutter vane 18, the position of vane 18 may be controlled by the position of vane 11. By this arrangement, the amount of overlap between aperture 19 and the partially established exposure aperture 30 is made a function of scene luminance, and the overlap between apertures 19 and 12 is caused to occur near the optical axis of taking lens 10.

Figure 3:
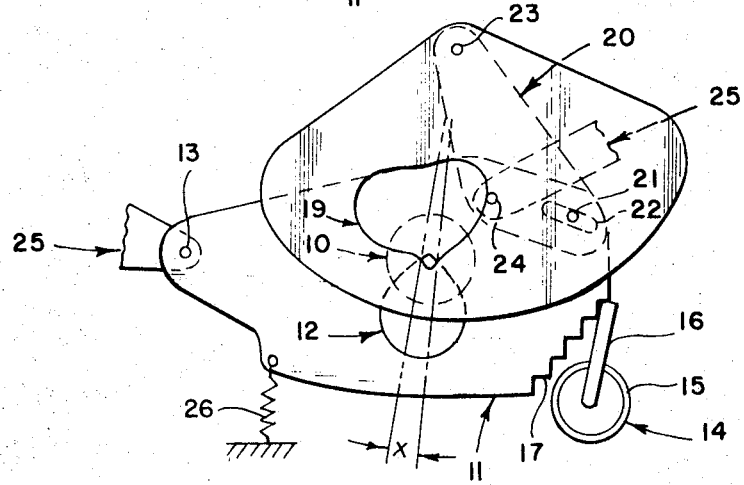

In operation of the system, the scene luminance level detecting device is directed at the scene to be photographed and indicating needle 16 is permitted to come to rest in a position indicative of the level of scene luminance. Aperture vane 11 is then caused to pivot about pin 13 in a clockwise direction, this pivotal movement being imparted in a manner to be described hereinafter. Teeth 17 then descend upon the tip of needle 16 so as to trap the latter and preclude further clockwise pivotal movement of aperture vane 11. As explained above, when aperture vane 11 engages needle 16, an exposure aperture 30 is partially established, this being shown in FIG. 2. During the clockwise pivotal movement of aperture vane 11, a similar clockwise rotation of linking member 20 about pin 24 is produced due to the engagement of pin 21 in slot 22. The rotation of linking member 20 about pin 24 then causes the axis of pivotal movement of shutter vane 18 (i.e., pin 23) to move and come to rest at a predetermined position such that when aperture 19 is caused to sweep across the partially established exposure aperture 30 at a substantially constant rate, a proper exposure aperture is completed and an exposure of the film is simultaneously effected, reference being made to FIG. 3. The exposure time, of course, is determined by the duration of the overlap between aperture 19 and the partially established aperture formed by aperture 12 and lens 10. As is shown in FIG. 3, the exposure time is function of the angle X, this angle representing the angular distance through which aperture 19 is in coincidence with the partially established aperture 30.

Figure 4:
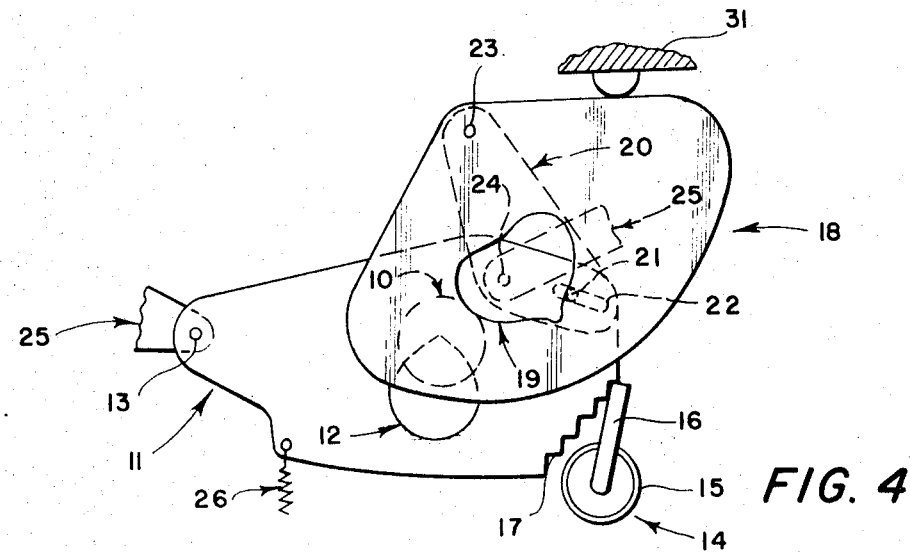

In FIG. 4, shutter vane 18 is shown in a position after exposure has been effected. As shown, shutter vane 18 impinges stop member 31, and thereby comes to rest.

Figure 6:
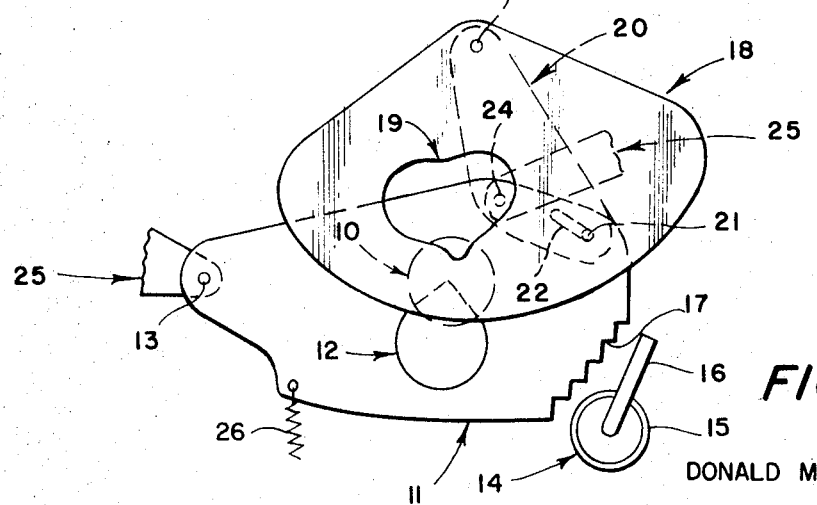
FIG. 6 shows the relative positions of the basic programmed shutter elements during recocking of the shutter member subsequent to exposure.

As shown in FIG. 6, cocking of shutter vane 18 without producing a double exposure may be accomplished in a simplified manner by simply disengaging needle 16 from teeth 17, rotating aperture 11 in a clockwise direction to such an extent that aperture 12 is wholly lower than the optical axis of lens 10, and then pivoting shutter vane 18 in a clockwise direction so as to return it to the preexposure position. Note, when aperture vane 11 is in this position, pivot pin 23 is raised to such an extent that apertures 12 and 19 are unable to overlap during the return of shutter vane 18. Thus, a double exposure is prevented. An exemplary structure for cocking the shutter aperture in a somewhat different manner will be discussed subsequently in connection with FIGS. 7—10.

In FIG. 5, the basic elements of the programmed shutter are shown at the time of exposure to a scene of low luminance. The position of the elements is essentially that shown in FIG. 3, the only difference being that needle 16 is in a position indicative of low scene luminance so that vane 11 is stopped at a different position. Thus, apertures 12 and 19 are both caused to be in a high degree of optical alignment with lens 10 and the resulting exposure aperture is comparatively large and the exposure time comparatively long.

An exemplary means for imparting movement to the aperture and shutter vanes during the exposure and recocking procedures is shown in FIGS. 7—10, this means simply comprising the shutter release member 35, with the associated springs 41 and 42, and stop member 43. Linking member 20 is omitted for clarity. As viewed in FIGS. 7—10, member 35 is the uppermost component in the stacked arrangement. Member 35 is pivotally mounted to the camera housing by means of pin 36 and is biased to rotate in a counterclockwise direction by means of spring 41 which is affixed to the camera housing. The most significant elements comprising member 35 are shutter actuating lever 37, light blocking tab 38, ear 39 which extends downwardly form the lower surface of member 35, and pin 40 to which one end of spring 42 is affixed, the other end being affixed to pin 34 of the shutter vane.

Figure 7:
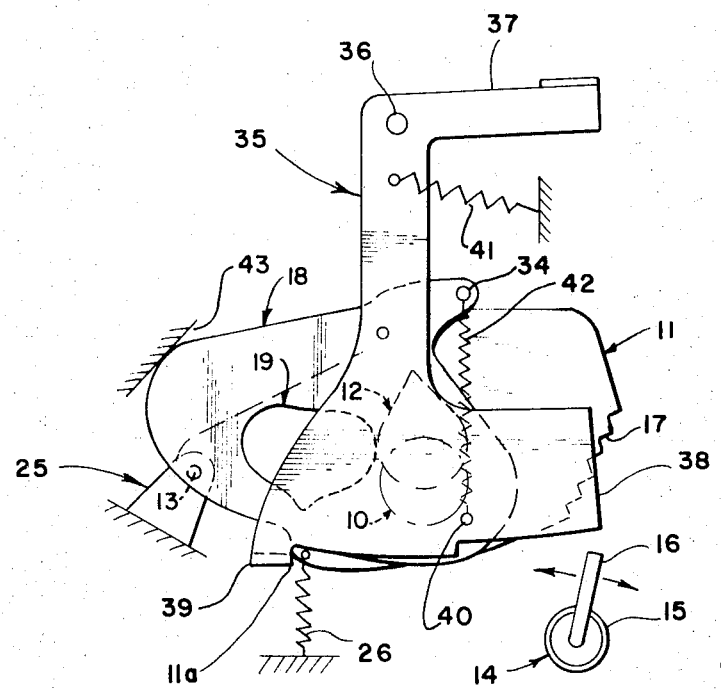
FIGS. 7—10 show two of the basic elements of the programmed shutter, in combination with a shutter release member, during various stages of shutter operation.
Figure 8:
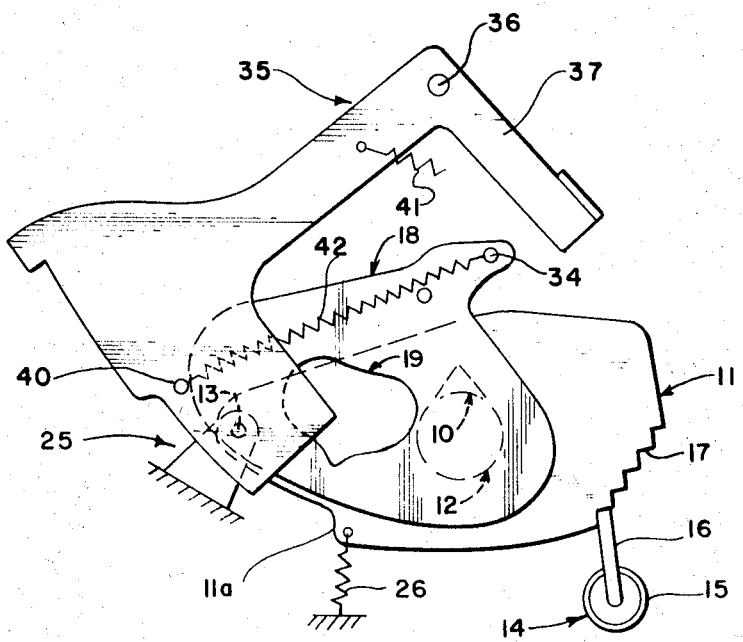

Referring to FIG. 7, the elements are shown in their respective positions immediately prior to exposure. Ear 39 of member 35 interacts with edge 11a of the aperture vane 11 and, due to the counterclockwise rotation of member 35 urged by spring 41, tends to rotate vane 11 a slight amount in a counterclockwise direction about pin 13, and thereby frees needle 16 from teeth 17. Vane 11 is permitted only a slight counterclockwise movement since spring 26, which biases vane 11 to rotate in a clockwise direction, is connected to the camera housing.

Figure 9:
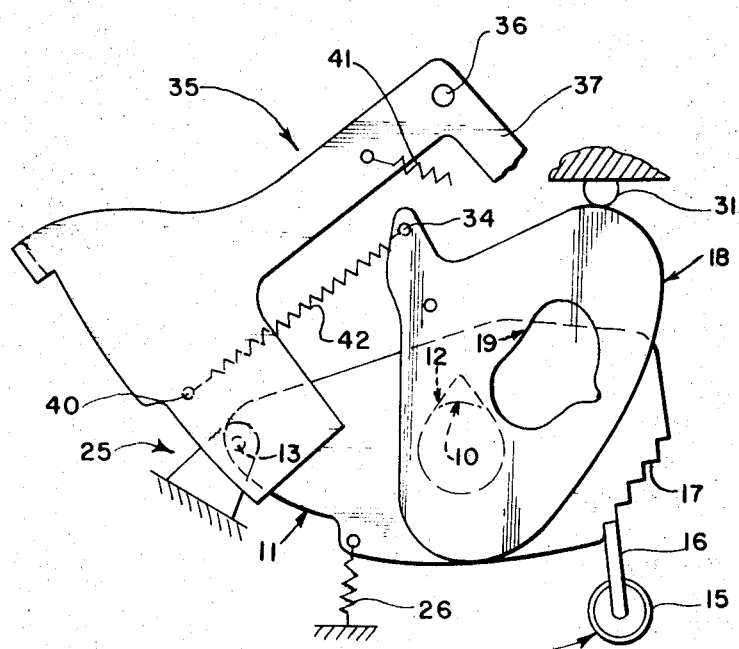

During the exposure procedure, the camera operator depresses lever 37 in a clockwise direction about pin 36 and ear 39 is thus disengaged from its contact with edge 11a of vane 11. Vane 11 is then permitted to rotate clockwise about pin 13 by means of biasing spring 26, causing teeth 17 to descend upon the tip of needle 16 and thereby position aperture 12 before lens 10 so as to partially establish an exposure aperture as described above. As shutter release member 35 continues to pivot in a clockwise direction about pin 36, the direction of spring bias on shutter vane 18 shifts from a clockwise to a counterclockwise direction. This shifting of spring bias is accomplished as spring 42 passes from one side of pivot pin 23 to the other. When spring 42 is on the right side of pin 23 as viewed in FIG. 7, vane 18 is urged to rotate in a clockwise direction. Such motion is prevented by stop member 43. However, when spring 42 is moved, during the clockwise rotation of member 35, to the left side of pivot pin 23, this being shown in FIG. 8, the direction of spring bias immediately reverses. Thus, since there is nothing to prevent a counterclockwise movement, vane 18 is driven in a counterclockwise direction and thereby causes aperture 19 to pass across the partially established exposure aperture 30 so as to effect an exposure. As shown in FIG. 9, vane 18 continues its movement until said vane is brought to a stop by means of stop member 31.

Figure 10:
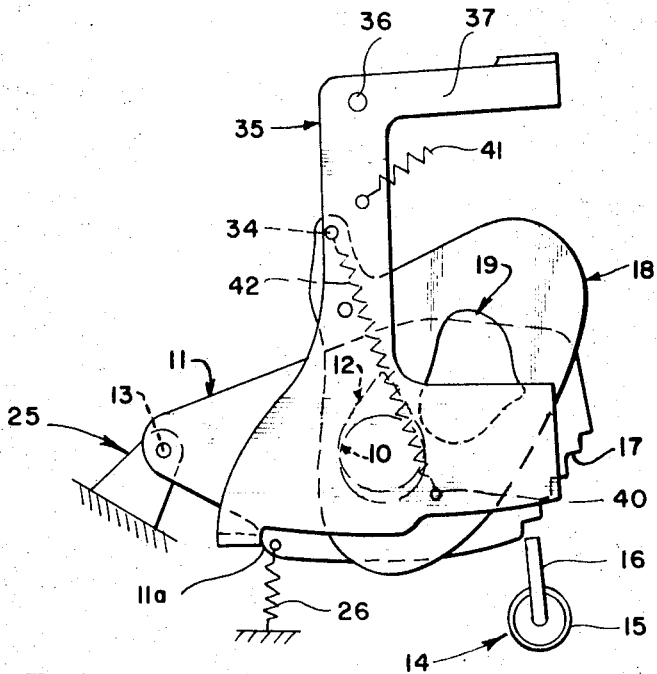

Immediately following exposure, pressure is released from actuating lever 37 and shutter release member 35 is permitted to rotate in a counterclockwise direction, under the force of spring 41, to its rest position shown in FIGS. 7 and 10. As shown in FIG. 10, ear 39 engages edge 11a just prior to a restoration of member 35 to its rest position and thereby causes vane 11 to rotate slightly in a counterclockwise direction about pin 13 so as to free needle 16 and permit the same to move freely.

When shutter release member 35 is restored to its rest position, the position of bias spring 42 will have been moved to the right side of pivot pin 23, and shutter vane 18 will again be biased to rotate in a clockwise direction about pin 23. In this manner, shutter vane 18 will be returned to its preexposure position. It should be noted that as shutter vane 18 is returned to its preexposure position under the force of spring 42, light blocking tab 38 of shutter release member 35 is positioned before lens 10 and thereby serves to prevent light from reaching the film plane when apertures 12 and 19 overlap, and thereby prevents a double exposure.

As can be readily appreciated from the foregoing description, the invention requires no elaborate mechanism for advancing the shutter past the exposure aperture at various speeds in order to accomplish a variety of exposure times. According to the invention, the shutter is moved at a substantially constant angular rate and various shutter speeds are accomplished by merely varying the overlap between the aperture formed in the shutter vane and the partially established exposure aperture formed by the coincidence of the aperture in the aperture vane and the taking lens. It is also obvious from the foregoing that the shortest exposure time will be produced when the effective $f$/number of the exposure aperture is at a maximum value, and conversely the longest exposure time will be produced when the effective $f$/number of the exposure aperture is at a minimum value. Thus, the programmed shutter effect is accomplished.

The invention has been described with particular reference to preferred embodiments thereof, but it will be understood by those skilled in the art that variations and modifications can be effected within the scope and spirit of the invention as described hereinabove and as defined in the appended claims.

I claim:

1. For use in a camera having means defining a taking aperture, an exposure control system comprising:
   a movable first vane having an aperture therein which is movable into varying degrees of coincidence with said taking aperture so as to partially establish an exposure aperture;
   means for controlling the degree of coincidence between said aperture of said first vane and said taking aperture in accordance with the level of field brightness of the subject matter to be photographed;
   a movable second vane having an aperture therein which is normally out of coincidence with said partially established exposure aperture but which is movable into varying degrees of coincidence therewith;
   means for controlling the degree of coincidence between said aperture in said second vane and said partially established exposure aperture in accordance with the level of field brightness of the subject matter to be photographed; and
   driving means for sweeping said aperture in said second vane across said partially established exposure aperture thereby simultaneously establishing an exposure aperture and effecting an exposure.

2. An exposure control system in accordance with claim 1 wherein said means for controlling the degree of coincidence between the aperture in said first vane and said taking aperture comprises, in part, an indicating needle, movable as a function of the field brightness of the subject matter to be photographed, said needle being arranged so as to be engageable with said first vane for positioning said first vane in accordance with the level of scene luminance of the subject matter to be photographed.

3. An exposure control system in accordance with claim 2 wherein said movable first vane is provided with a plurality of teeth on the periphery thereof, said teeth being engageable with said indicating needle for positioning said vane in accordance with the level of scene luminance of the subject matter to be photographed.

4. An exposure control system in accordance with claim 2 further comprising means for disengaging said needle from said first vane subsequent to exposure.

5. An exposure control system in accordance with claim 1 further comprising means for coordinating movement of the coinciding portions of the apertures formed in said first and second vanes to centrally locate said apertures with respect to the central axis of said taking aperture when exposure is effected.

6. For use in a camera comprising a housing having means defining a picture taking aperture, an improved programmed shutter comprising:
   a movable first vane having an aperture formed therein, said first vane being arranged so as to permit its aperture to be moved into varying degrees of optical alignment with said picture taking aperture so as to partially establish an exposure aperture;
   a movable second vane having an aperture formed therein, said second vane being arranged so as to permit its aperture to be moved into varying degrees of optical alignment with said partially established exposure aperture thereby completing the establishment of an exposure aperture; and
   means interconnecting said first and second vanes for controlling the degree of optical alignment between said partially established exposure aperture and said aperture of said second vane, said interconnecting means comprising a linking member which is pivotally mounted on said camera housing at an intermediate part thereof, one end of said member being movably coupled with said first vane, and the other end of said member being movably coupled with said second vane.

7. The invention according to claim 6 wherein said first vane is pivotally mounted on said camera housing so as to permit its aperture to be moved into varying degrees of optical alignment with said picture taking aperture during the pivotal movement thereof, and said second vane is pivotally coupled with said linking member so as to permit the aperture formed in said second vane to be moved into varying degrees of optical alignment with the coinciding portions of the picture taking aperture and the aperture formed in the first vane.

8. The invention according to claim 7 wherein the paths of said first and second vanes are substantially orthogonal with respect to one another at the point at which the apertures formed in said vanes coincide during travel along their respective paths.